Feb. 25, 1969    A. MAZEIKA    3,429,332
REPLACEMENT CARTRIDGE INFLATOR GAUGE
Filed Oct. 23, 1965    Sheet 1 of 2
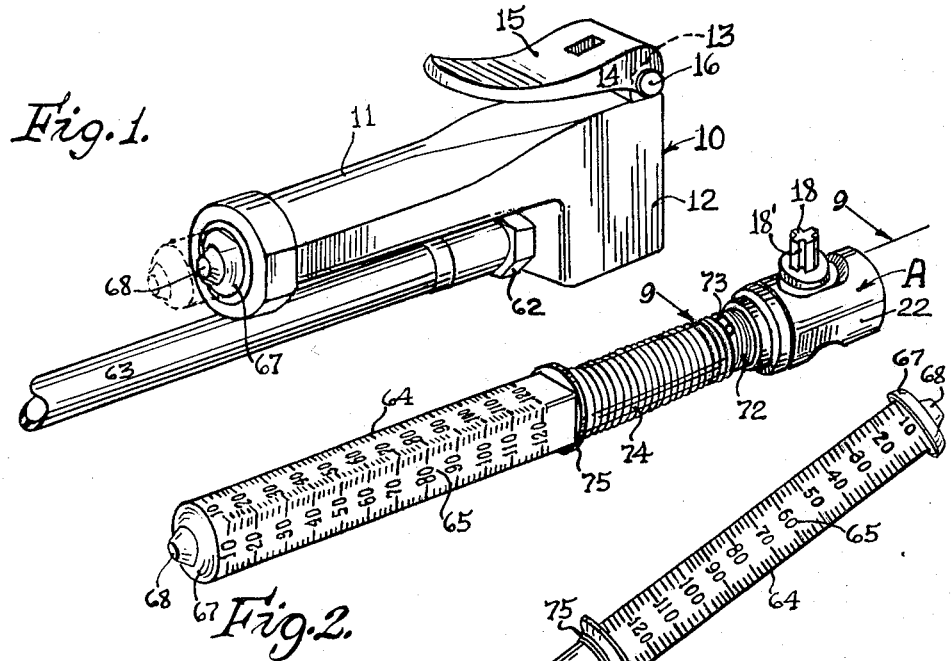
INVENTOR.
ALBERT MAZEIKA
BY Edward C. Threedy
HIS ATTORNEY.

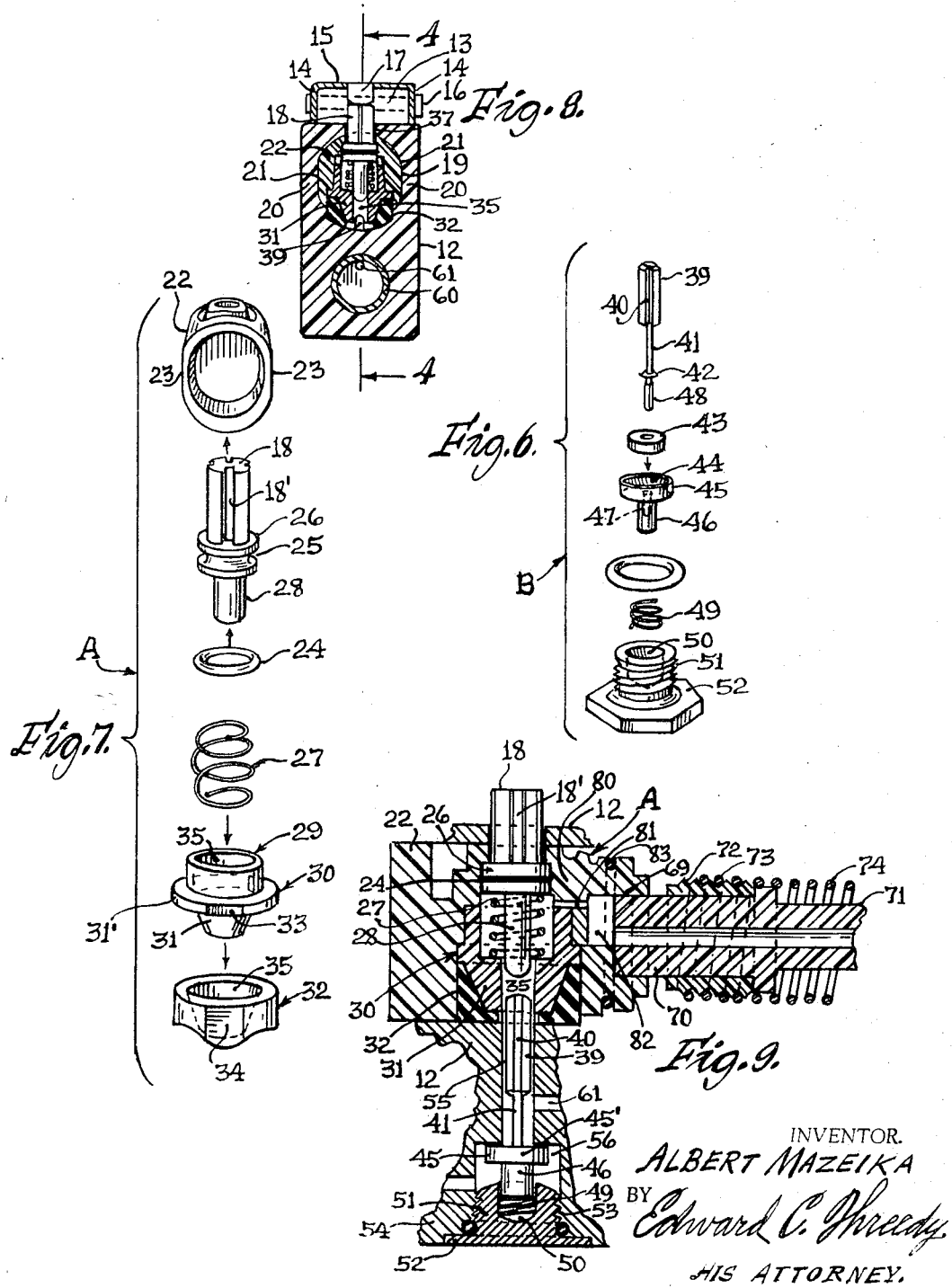

United States Patent Office 3,429,332
Patented Feb. 25, 1969

3,429,332
REPLACEMENT CARTRIDGE
INFLATOR GAUGE
Albert Mazeika, Chicago, Ill., assignor to Milton Manufacturing Company, Inc., Chicago, Ill., a corporation of Illinois
Filed Oct. 23, 1965, Ser. No. 503,329
U.S. Cl. 137—227                                4 Claims
Int. Cl. F16k *15/20, 37/00;* B60c *23/00*

ABSTRACT OF THE DISCLOSURE

A replaceable cartridge inflator gauge for use in garages, service stations, and the like, for inflating and deflating vehicle tires, air tanks, and other such pressure vessels and indicating the air pressure therein, in which the valve and its associated pressure indicator bar are assembled as a single unit which is removable for replacement or repair purposes as a unit from the valve housing and the barrel of the air extension tube.

*Summary of the invention*

An object of the invention is to provide a replacement cartridge inflator gauge which is compact, durable, simple in operation and construction, positive in action, and accurate in indicating the air pressure, and which can be convenently handled and manipulated for the purposes for which it is used, and which by its design combines the mechanisms now contained in two separate cartridges, into one cartridge, and utilizes theory, design and construction not heretofore discovered or used in other inflator gauges.

Heretofore in the art of inflator gauges, the air control valve cartridge and the pressure-indicating cartridge for measuring the degree of air pressure in a tire or the like, were assembled as separate components, separately removed when worn or otherwise rendered ineffective as a result of electrolytic action in normal usage, and often could not be removed to enable replacement of the cartridge, thereby requiring that the gauge be returned to the manufacturer for repair, during which time the gauge is taken out of service.

My invention has as an important object, in addition to arranging such components in a novel and unique manner, providing a single cartridge which may be quickly and easily removed and replaced with the minimum degree of time, labor and effort and without taking the gauge out of service or requiring the use of special tools or skill.

Another equally important object of my invention is the utilization of plastic and synthetic materials in the design and construction of a single replacement cartridge so arranged that all surfaces in contact with the housing in which said cartridge is contained provide no materal conducive to the creation of an electrolytic action between the cartridge unit and the housing when subjected (in normal use) to the effects of condensation, moisture and corrosive liquids which are in normal usage introduced into such gauges and which is one of the major causes in rendering all known replacement cartridges to become inaccurate and/or inoperative, as a result of normal use, as well as preventing normal replacement without return to the manufacturer for removal and repair.

Yet another object of my invention is to reduce the number of component parts contained in the air control valve section of the cartridge so as to achieve a greatly reduced cost of manufacture; this being achieved by the transfer of these components from the air control valve into the housing construction as a permanent non-replaceable segment thereof, and thereby eliminating the need for additional cost of manufacture and the subsequent additional cost to the user for the additional components contained in each replacement air control valve cartridge which the user must replace to maintain continued performance during the service life of the housing in all other known replacement cartridge gauges.

Other objects will appear hereinafter.

The invention consists in the novel combination and arrangement of parts to be hereinafter described and claimed.

The invention will be best understood by reference to the accompanying drawings showing the preferred form of construction, and in which:

FIG. 1 is a fragmentary perspective view to reduce scale of an inflator gauge embodying my invention;

FIG. 2 is a perspective view of the replacement cartridge embodying my invention;

FIG. 3 is a perspective view of the same, showing the parts thereof in exploded relation with respect to each other;

FIG. 4 is a sectional detail view taken substantially on line 4—4 of FIG. 8;

FIG. 5 is a fragmentary perspective view to reduced scale illustrating the partial assembly of the cartridge illustrated in FIG. 2 into the housing;

FIG. 6 is a perspective view of the inflator valve parts showing the same in exploded position;

FIG. 7 is a perspective view of the parts of the gauge valve showing the same in exploded relation;

FIG. 8 is a sectional detail view taken substantially on line 8—8 of FIG. 4;

FIG. 9 is a fragmentary sectional detail view taken substantially on line 9—9 of FIG. 2.

In FIG. 1 of the drawings, 10 indicates the device as a whole. The device comprises a gauge barrel 11 formed as an integral part of a metal housing 12 within which are arranged the air control valve A and the inflator valve B (FIGS. 6–7) to be presently described.

The housing 12 at its top wall provides a transversely extending bearing sleeve 13 which projects between flanges 14 of an actuating lever 15. The flanges are pivotally connected to the sleeve 13 by means of a pintle 16 which extends through the sleeve 13 and is fixedly secured against removal therefrom in any suitable manner.

Struck from the lever 15 is a depending lip 17 (FIGS. 4 and 8) which is adapted to engage a valve plunger 18 for reasons to be presently explained. The plunger 18 which is formed of plastic is provided with one or more bleeder grooves 18' through which air is bled in the event of over-inflation. These grooves also serve to reduce friction which would otherwise tend to retard movement of the plunger 18.

Formed in the housing 12 is a socket 19 which communicates with the gauge barrel 11. Opposite corresponding walls 20 of the body defining the socket 19 are formed with relatively flat surfaces 21 for reasons hereinafter pointed out.

An elongated gauge valve body 22 formed of plastic is shaped to substantially correspond to the shape of the socket 19 and includes flat walls 23 which are adapted to abut the flat walls 21 of the socket 19 and be thereby held against rotation within the socket 19.

The valve body 22 houses the parts of the air control valve A, which parts are shown in FIG. 7 in exploded relation with respect to each other. These parts include, in addition to the valve plunger 18, an O ring 24 which is mounted in a groove 25 formed in a collar 26 formed as an integral part of the plunger 18. A buffer spring 27 encircles a reduced inflator-pin-actuating stud 28 provided by the plunger 18. One end of the spring 27 engages the collar 26 (FIG. 7). The opposite end of the spring 27 is seated in a ring 29 formed of plastic, which ring is an integral part of a valve insert 30 having a conical insert 31 (FIG. 7) extending beneath a flange 31'. The conical insert 31 snugly fits into a conical recess provided by a seal 32. The flange 31' has a flat edge portion 33 which, when the valve insert 30 is assembled with the valve seal 32, is in alignment with a similar flat surface 34. The valve insert and valve seal have aligned bores 35 formed therein. When the parts illustrated in FIG. 7 are assembled in the valve body 22, the plunger 18 engages the lip 17 of the lever 15 (FIGS. 1 and 4). By this arrangement, when the lever 15 is pivoted down upon the housing 12, the plunger 18 will be forced downwardly against the action of the spring 27, projecting the stud 28 into the valve insert 30 and closing passage through the bores 35.

With the components shown in FIG. 7 operatively assembled with respect to each other and within the housing 12 as shown in FIGS. 4 and 9, the valve body 22 is inserted in the socket 19 to a position where the inner end portion of the valve body 22 will abut a shoulder 36 formed at the junction of the socket 19 and the bore of the barrel 11. When in the act of inserting the valve body in the socket 19, the flat surfaces 23 thereof are positioned to engage between the flat surfaces 21 of the sockets 19. These flat surfaces cooperate to align the plunger 18 with the opening 37 formed in the top wall of the housing 12 (FIGS. 4, 8 and 9).

Prior to insertion of the valve body 22 with the components of FIG. 7 assembled therein, into the housing 12, the plunger 18 is depressed into the valve body 22 so as to allow the valve body 22 to pass into the socket 19.

When the valve body 22 has reached the extent of its insertion, the plunger 18 by the action of the spring 27 will be projected through the opening 37 (FIGS. 4 and 8) into a position to be engaged by the lip 17 when the lever 15 is pivoted. The open end of the socket 19 is closed by an end cap 19' which is threaded into the socket 19 (FIGS. 3 and 4). The cap 19' is formed of plastic to assure ready and easy removal of such cap, eliminating the effects of electrolytic action or normal usage distortion now existent among all known gauges.

An inflator valve is generally indicated at B (FIG. 4), the components of which are shown in FIG. 6 in exploded relation. In this connection, 39 indicates an inflator pin having a longitudinally extending groove 40. The lower end portion of the pin 39 comprises a shank 41 having formed as a part thereof a flange 42 positioned a predetermined distance from the lower end of the shank 41.

An inflator washer 43 is positioned on the shank 41 beneath and in engagement with the flange 42. This washer is adapted to seat in a socket 44 provided by a cylindrical cup 45 formed as an integral part of an extension 46. The washer 43 and cup 45 provide an inflator seal generally indicated at 45' (FIGS. 4 and 9). The extension 46 has a counterbore 47 formed therein into which is driven the portion 48 of the shank 41, to provide a permanent connection between the cup 45 and the shank 41. A spring 49 is located in a socket 50 formed in a threaded stud 51 which is an integral part of a closure plug 52 adapted to be threaded into a thread-bearing opening 53, formed in the bottom wall 54 of the housing 12. The extension 46, while extending into the socket 50, is of a length shorter than the depth of the socket 50 for reasons which will presently be understood, and is normally projected from engagement with the bottom wall of the socket 50 by the spring 49. When the inflator valve parts as shown in FIG. 6 are in assembled relation with respect to each other, they are positioned in the valve housing 12 in the manner shown in FIGS. 4 and 9.

The inflator pin 39 is operable in a bore 55 which communicates with the bores 35 of the valve insert 30 and seal 32 and with a counterbore 56, in which counterbore operates the inflator seal 45'. Such inflator seal 45' is normally urged in sealing position with respect to the bore 55 by the spring 49. A thread-bearing counterbore 57 (FIG. 4) is formed in the housing 12 and communicates with the counterbore 56 through a port 59. The counterbore 56 in turn communicates with a threaded end plug 60, through a passage 61 (FIGS. 4 and 9). The end plug 60 has a stepped stud 62 formed thereon to which is attached the inflator hose 63.

The hose 63 at its outer end portion has connected thereto the conventional chuck head (not shown) which is adapted to engage the valve stem of a tire, tube, or other pressure vessel so equipped.

A pressure-indicating bar is indicated at 64 (FIGS. 2, 3 and 4) formed of plastic. The major portion of its length is substantially rectangular in cross section and the flat surfaces thereof have printed or stamped thereon calibrated indicia 65, preferably increments of 10, representing pounds of air pressure.

This pressure-indicating bar 64 is of hollow construction and has an inner end portion 66 likewise formed of plastic and which is substantially circular in cross section. At the outer end a weather seal is indicated at 67 and is attached to the end portion of the pressure-indicating bar 64 by a retainer bolt pin 68 (FIGS. 1 to 4). This seal 67 engages the outer end of the barrel 11 when in its innermost position in such barrel.

The valve body 22 has a counterbore 69 into which is fitted in any suitable manner the enlarged end portion 70 of an air extension tube 71 formed of plastic and which is adapted to project into the pressure-indicating bar 64 as shown in FIG. 4. This enlarged end portion 70 has a fixed thread-bearing collar 72 formed of plastic, upon which collar is threaded one end portion 73 of a gauge spring 74, the opposite end portion of the spring 74 being threaded upon a fixed collar 75 provided by the cylindrical portion of the bar 64.

The air extension tube 71 has its end 76 closed by an end plug 77 which bears against a piston seal 78 (FIG. 3), the latter engaging the inner walls of the hollow pressure-indicating bar 64 and its extension 66. The end plug 77 has an opening 79 which communicates with the passage through the air extension tube 71.

The valve body 22 has a wall 80 provided with an outlet air port 81 which, through the chamber 82, communicates with the air extension tube 71 (FIG. 9).

The flat surfaces 21 and 23 of the socket 19 and the valve body 22 cooperate to restrain the valve body 22 from rotating when the spring 74 is adjusted upon the threaded collars 72 and 75. The valve body 22 has mounted thereon an O ring 83 providing a seal between the valve body 22 and the housing 12.

The counterbore 57 has mounted therein a wire mesh screen 57' which prevents foreign matter from passing through the port 59. Threaded into this counterbore is a nipple (not shown) to which an air supply hose (not shown) is connected.

Inserted in the bar 64 is a spring 85 which serves to flare and flex the piston seal 78 when the bar is retracted into the barrel 11 by action of the spring 74 attached to such bar.

Prior to insertion of the cartridge comprising the pressure-indicating bar and air control valve components, the bar 64 is adjusted upon the air extension tube 71 by rotating the bar 64 relative to the spring 74. This adjustment is made at the factory so that the pressure-indicating bar 64 will give a proper indication or reading of the air pressure within the tire or vessel measured. The chuck (not shown) of the hose 63 is placed upon the tire valve (not shown) in the usual manner to open the valve for inflation, deflation, and gauging purposes. The operator holding the housing 12 in the palm of his hand with his thumb engaging the lever 15, will pivot the lever 15 downwardly so as to depress the plunger 18. This depressing of the plunger 18 will move the seal 24 into sealing position below the port 81 (FIG. 9) to block the passage of air into the chamber 82. Simultaneously with this action, the stud 28 will engage the end of the inflator pin 39 to move the seal 45′ from sealing position with respect to the bore 55, thus allowing communication between the bore 55 and the passage 61 for the flow of air into the hose 63 and thence into the tire or vessel.

Periodically during the inflation operation, the operator will release his thumb pressure on the lever 15 to permit the seal 45′ to seal the passage or bore 55 and thus cut off air flow through the hose 63, while air is allowed to flow from the tire or vessel through the groove 40 formed in the pin 39 and thence through the port 81 into and through the air extension tube 71 to project the pressure-indicating bar 64 a distance outwardly from the barrel 11 commensurate with the air pressure in the tire or vessel, which air pressure will be indicated by the indicia 65 on the bar 64.

As before stated, one of the principal objects of my invention is combining the pressure-indicating cartridge mechanism and the air control valve cartridge mechanism in a single cartridge so that the same may be, as a single structure, readily replaced when occasion requires. The cartridge is mounted in place in the barrel 11 in the manner hereinbefore stated. By combining these separate cartridge mechanisms into a single cartridge, the user may obtain or maintain a reserve supply of such cartridges for replacement purposes and by so doing insure continued use of the device to an extent not offered by other known devices, and with an efficiency of replacement and cost not afforded by any other construction.

The use of an extension spring (coils closed at rest) results in the measurement of a full range of air pressure (i.e. 10 to 120 lbs.) in a small and compact structure and provides a means of eliminating the common error inherent in compression spring usage (coils open at rest) as now used in other known replacement pressure-indicating cartridges. Since the compression springs now used present an S curve in performance demonstrated by weakness of the spring and subsequent high readings as the end coils are initially being closed, and greater resistance with subsequent low readings as the spring is closed toward solid height, the use of an extension spring which exhibits uniform characteristics (rate per inch) throughout its entire length is a highly desirable characteristic, enabling reduction in cartridge size while offering greater accuracy than is inherent in compression type springs.

Furthermore, the use of my invention enables the employment of a solid guide (i.e. air extension tube) for the pressure-indicating bar to ride on, thus eliminating the friction factors and erratic readings caused in all other replacement pressure-indicating cartridges by construction which has the indicator either ride over (i.e. around) or inside the spring, thereby using the spring as its effective guide, and thereby being subjected to the erratic frictions of the spring as it contorts in compression, without any means of insuring positive, smooth, straight line, guided motion, as in inherent in my invention. As a result of the unique construction made possible through my invention, the air extension tube feature above referred to not only provides a heretofore unrealized benefit, but enables a construction whereby the air control valve cartridge can be joined onto the pressure-indicating cartridge in order to form a single, self-contained replacement cartridge which in and of itself performs all of the functions heretofore requiring two separate and distinct replacement cartridges.

While I have illustrated and described the preferred form of construction for carrying my invention into effect, this is capable of variation and modification without departing from the spirit of the invention. I therefore do not wish to be limited to the precise details of construction set forth, but desire to avail myself of such variations and modifications as come within the scope of the appended claims.

Having thus described my invention, what I claim as new and desire to protect by Letters Patent is:

1. An inflator guage comprising
   (a) a housing having a socket formed therein and an opening communicating with said socket,
   (b) a removable end cap for closing said opening,
   (c) a barrel integral with said housing and communicating with said socket,
   (d) an inflator valve mechanism carried by said body,
   (e) a replacement cartridge comprising
   (f) a valve body mounted in said socket and having an outlet air port,
   (g) an air extension tube carried by said valve body and extending therefrom within said barrel and communicating with said air port,
   (h) a pressure-indicating bar embracing said tube for projection therealong,
   (i) valve mechanism confined in said body for the control of the flow of air through said air port into and through said tube to project said bar as aforesaid,
   (j) means for actuating said valve mechanism and said inflator valve mechanism,
   (k) and a spring surrounding said tube and having one end portion connected to said tube adjacent said body and an opposite end portion connected to said bar,
   (l) said replacement cartridge being removable as a unit from said barrel through said opening provided by said housing when said end cap is removed therefrom.

2. An inflator valve gauge comprising:
   (a) a housing (12) having a socket formed therein, said housing having an opening communicating with said socket,
   (b) a closure cap (19′) threaded into said opening,
   (c) a barrel (11) integral with the housing and projecting therefrom and communicating with the socket opposite said opening,
   (d) a replaceable cartridge mounted in said socket through said opening and into said barrel, said replaceable cartridge comprising:
   (e) a valve body (22) mounted in said socket and having an outlet air port (81),
   (f) an air extension tube (71) carried by said valve body and extending therefrom into said barrel and communicating with said air port,
   (g) a pressure indicating bar (64) embracing said tube within said barrel for projection with respect to said tube longitudinally thereof,
   (h) valve mechanism (A) arranged in said body for the control of the flow of air through said air port into and through said tube to project said bar as aforesaid, and
   (i) a spring surrounding said tube and having one end portion connected to said tube adjacent said body and an opposite end portion connected to said bar;
   (j) an inflator hose (63) attached to said body for communication with said air port, and
   (k) means carried by said housing for actuating said valve mechanism.

3. The cartridge defined in claim 2 in which said spring embraces said tube and has adjustable threaded connection therewith adjacent said body and with one end of said bar.

4. The inflator gauge defined in claim 2 wherein said valve actuating means includes a plunger and further characterized by the inclusion of an opening in the top wall of said housing through which an end of said valve-actuating plunger projects and a thumb-actuated lever pivotally carried by said housing and engaging said end of said plunger.

References Cited

UNITED STATES PATENTS

| | | | |
|---|---|---|---|
| 1,305,263 | 6/1919 | Earnheart | 73—146.8 X |
| 1,870,574 | 8/1932 | Key | 137—229 |
| 2,057,321 | 10/1936 | Alnett et al. | 137—229 |
| 2,501,801 | 3/1950 | Wallin | 137—229 X |
| 3,195,561 | 7/1965 | Sovitzky | 137—315 |

FOREIGN PATENTS

| | | |
|---|---|---|
| 250,878 | 1/1964 | Australia. |
| 346,012 | 3/1931 | Great Britain. |
| 347,172 | 4/1931 | Great Britain. |
| 441,222 | 1/1936 | Great Britain. |

WILLIAM F. O'DEA, *Primary Examiner.*

DENNIS H. LAMBERT, *Assistant Examiner.*

U.S. Cl. X.R.

73—146.3